United States Patent [19]

Daimon et al.

[11] Patent Number: 5,139,884
[45] Date of Patent: Aug. 18, 1992

[54] MAGNETIC RECORDING MEDIUM COMPRISING AN ALUMINUM SUBSTRATE IN WHICH PORES FORMED BY ANODIC OXIDATION CONTAIN CRYSTALLOGRAPHICALY DISCONTINUOUS PARTICLES OF FE-ALLOY

[75] Inventors: Hideo Daimon, Toride; Hideo Fujiwara, Ibaraki; Yoichi Ogawa; Osamu Kitakami, both of Ibaraki, all of Japan

[73] Assignee: Hitachi Maxell, Ltd., Osaka, Japan

[21] Appl. No.: 361,121

[22] Filed: Jun. 2, 1989

[30] Foreign Application Priority Data

Jun. 3, 1988 [JP] Japan .................. 63-135442
Nov. 25, 1988 [JP] Japan .................. 63-297299

[51] Int. Cl.$^5$ ............................................. G11B 05/00
[52] U.S. Cl. ........................... 428/402; 428/694; 428/900
[58] Field of Search ........... 428/117, 694, 900, 653, 428/402; 204/27, 28, 33, 37.6, 38.3, 44.7

[56] References Cited

U.S. PATENT DOCUMENTS

| | | | |
|---|---|---|---|
| 2,758,075 | 8/1956 | Swalheim | 204/28 |
| 4,109,287 | 8/1978 | Kawai et al. | 360/131 |
| 4,128,691 | 12/1978 | Shirahata et al. | 428/336 |
| 4,393,110 | 7/1983 | Fukuda | 428/173 |
| 4,495,074 | 1/1985 | Hagiwara et al. | 210/695 |
| 4,650,708 | 3/1987 | Takahashi | 428/216 |
| 4,808,279 | 2/1989 | Moskovits et al. | 204/28 |

FOREIGN PATENT DOCUMENTS 0199271 10/1986 European Pat. Off. .

OTHER PUBLICATIONS

Patent Abstract of Japan, vol. 11, No. 256 (P-607) 2703, Aug. 20th, 1987, pp. 125, P 607 and JP-A 62-62417 (Mitsubishi Electric Corp.) Mar. 19, 1987 and JP-A-62-62418 (Hitachi Metals Ltd.) Mar. 19, 1987.
8108, I.E.E.E. Transactions on Magnetics MAG-22 (1986) Sep., No. 5, New York, N.Y., U.S.A.
Patent Abstract of Japan, vol. 11, No. 256b (P-607) 2703, Aug. 20th, 1987, p. 125, P 607; and JP-A-62-62419 (Pilot Precision Co.) Mar. 19, 1987.

Primary Examiner—Paul J. Thibodeau
Assistant Examiner—Stevan A. Resan
Attorney, Agent, or Firm—Birch, Stewart, Kolasch & Birch

[57] ABSTRACT

Provided according to the present invention are a perpendicular magnetic recording medium filled with a magnetic metal containing Fe as a main component in the fine pores of an alumite formed by anodic oxidation of a surface of an Al or Al alloy substrate, the particles of Fe in the filled magnetic metal being crystallographically discontinuous, and a process for the production thereof.

6 Claims, 9 Drawing Sheets

P. CONTAINED    MAGNIFICATION: x 176,000

No P CONTAINED    MAGNIFICATION x 176,000

P CONTAINED     MAGNIFICATION x10,500     P CONTAINED

No P CONTAINED     MAGNIFICATION x10,500     No P CONTAINED

P CONTAINED  MAGNIFICATION: x 16,000

No P CONTAINED  MAGNIFICATION: x 16,000

P CONTAINED    MAGNIFCATION: x 16,000

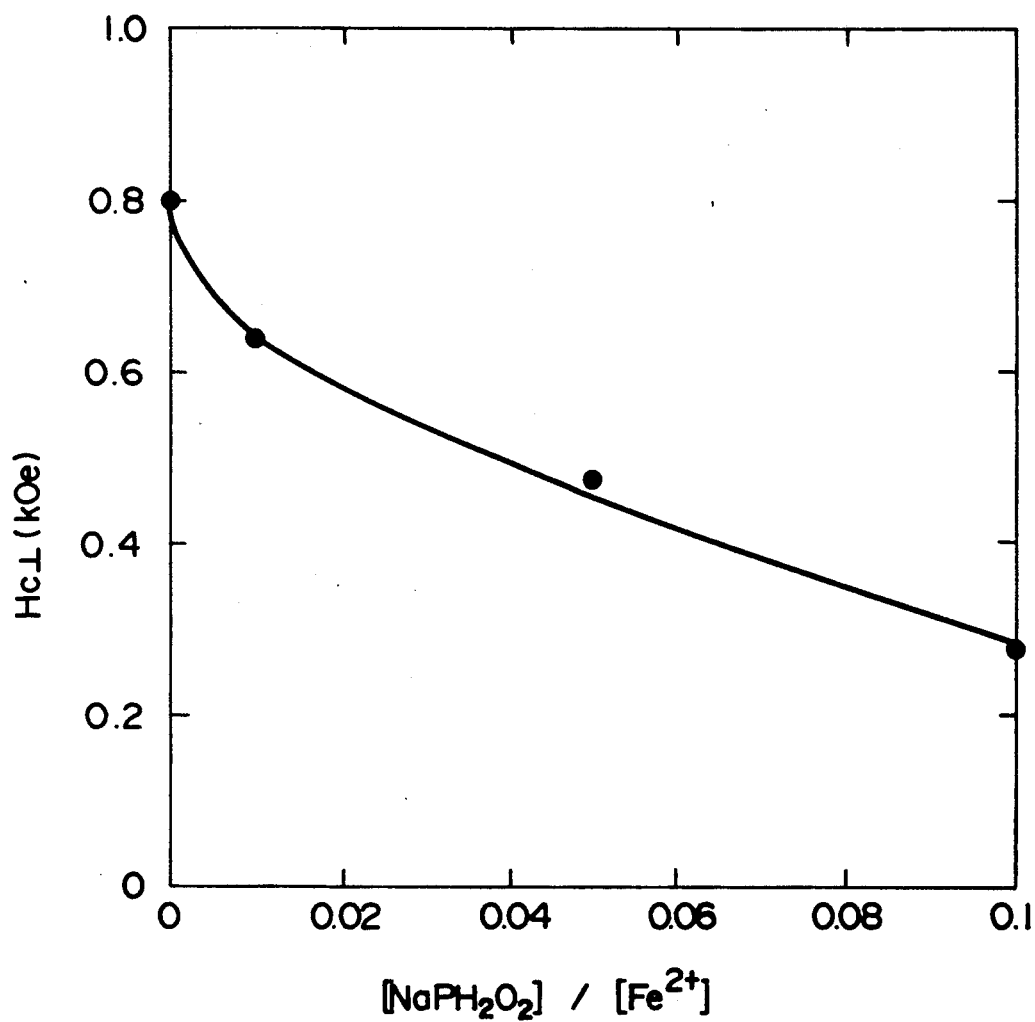
F I G. 7

MAGNETIC RECORDING MEDIUM COMPRISING AN ALUMINUM SUBSTRATE IN WHICH PORES FORMED BY ANODIC OXIDATION CONTAIN CRYSTALLOGRAPHICALY DISCONTINUOUS PARTICLES OF FE-ALLOY

BACKGROUND OF THE INVENTION

This invention relates to a magnetic recording medium. More specifically, it relates to a perpendicular magnetic recording medium of which the coercive force is controlled to be suitably low and which has excellent perpendicular magnetic anisotropy, and a process for the production thereof.

A magnetic recording medium produced by the anodic oxidation of Al or Al alloy and the filling, by plating, of the fine pores of the resultant alumite with a ferromagnetic metal, such as Fe, etc., exhibits excellent perpendicular magnetic anisotropy owing to its large phase magnetic anisotropy, and such a magnetic recording medium is expected to be a high-density magnetic recording medium.

For example, when Al or Al alloy is anodized in an oxalic acid bath (bath voltage ~40 V), the resultant alumite has a cell diameter of about 1,000 Å, and the 1,000 Å cells therefore constitute minimum recording units. In a CoCr film, which is a typical perpendicular magnetization film, the diameter of columns within the film is 200~300 Å, and its minimum recording unit is therefore considered to be ~300 Å. Hence, in order to achieve a high-density recording in the same level as in the CoCr film, a Fe plated alumite film with a small cell diameter is required. An alumite manufactured by using a sulfuric acid bath (bath voltage ~17 V) has a small cell diameter of about 450 Å. However, the diameter of a pore (pore formed in the cell) is about 150 Å, and when a perpendicular magnetization film is formed in that state by carrying out Fe plating to deposit Fe in the fine pores of the alumite, the problem is that the resultant film exhibits a perpendicular coercive force of 2,000 Oe or more, and the magnetic recording with a magnetic head is impossible.

Another existing problem is that when the coercive force is decreased to about ~500 Oe by treating the anodic oxidation film to enlarge its fine pore diameter to about ~350 Å, the shape magnetic anisotropy of the perpendicular magnetization film is not only degraded, but the interdistance of Fe particles is also shortened, and the magnetic separation of the Fe particles is insufficient. Thus, the magnetic film shifts from a perpendicular magnetization film to an in-plane magnetization film, and the perpendicular magnetic anisotropy necessary for a high-density recording medium is degraded. Further, in the above alumite produced by using an oxalic acid bath, its pore diameter is required to be enlarged to 400 Å or more in order to achieve the corecive force of 1,000 Oe or less in which the magnetic recording is made possible.

SUMMARY OF THE INVENTION

It is an object of this invention to provide a magnetic recording medium having a perpendicular magnetization film of an alumite with plated Fe suitable for high-density recording, wherein the perpendicular magnetization film has a saturation magnetization of 200~600 emu/cc and a perpendicular coercive force of 500~1,000 Oe, and a process for the production thereof.

As means to accomplish the above object, this invention provides a perpendicular magnetic recording medium filled with a magnetic metal containing Fe as a main component in the fine pores of an alumite formed by anodic oxidation of Al or Al alloy, Fe in the form of particles being crystallographically discontinuous.

With regard to formation of crystallographical discontinuity of the Fe particles filled in the alumite fine pores, one formation process comprises filling, by plating, Fe in the alumite fine pores, and incorporating phosphorus (P) atoms into the plated Fe.

This invention provides not only the above magnetic recording medium but also a process for production of a magnetic recording medium, which comprises anodizing a surface of an Al or Al alloy substrate to form an alumite and filling its fine pores with a P atoms-containing Fe-based ferromagnetic material of Fe type to form a perpendicular magnetization film, a predetermined amount of phosphite and/or hypophosphite being added into an Fe plating bath to be used to fill Fe in the fine pores by plating.

With regard to the production of a magnetic recording medium by anodizing a surface of an Al or Al alloy substrate to form an alumite and filling its fine pores with a P atoms-containing ferromagnetic material of Fe type to form a perpendicular magnetization film, there is another process for formation of a perpendicular magnetization film, which comprises adding at least one of phosphite and/or hypophosphite compounds to an Fe-plating bath to prepare an Fe-P plating bath having a predetermined composition, removing dissolved oxygen from the plating bath, and immersing an anodized film in the Fe-P plating bath under an inert gas atmosphere to fill Fe containing a predetermined amount of P-atoms in the fine pores of the above anodized film by deposition according to an electroplating method.

BRIEF DESCRIPTION OF THE DRAWINGS:

FIG. 7 is a characteristic illustration showing a relationship between an NaPH$_2$O$_2$/Fe$^{2+}$ molar ratio and a perpendicular coercive force.

DETAILED DESCRIPTION OF THE INVENTION

With regard to the magnetic characteristics of a perpendicular magnetization film obtained by filling Fe in the fine pores of an alumite by plating, it is preferable to control the saturation magnetization of the perpendicular magnetization film to achieve 200 ~600 emu/cc and control its perpendicular coercive force to achieve 500 ~1,000 Oe, in view of the magnetic characteristics and recording reproduction characteristics of the typical perpendicular magnetization film, CoCr alloy film.

The saturation magnetization can be adjusted into the above-mentioned range by means of the porosities which can be determined according to pore diameters and cell diameters. On the other hand, the perpendicular coercive force depends on pore diameters to a great extent. In order to control the perpendicular coercive force and achieve 1,000 Oe or less in which a recording and reproduction are possible, the alumite prepared by using an oxalic acid bath is required to have a pore diameter of not less than 400 Å. Alumite films having a pore diameter of less than 400 Å have been unsuitable as a recording medium in terms of the perpendicular coercive force. Further, in those having a pore diameter of 400 Å or more, it has been impossible to change the coercive force of their plated films without changing the pore diameter. If the pore diameter is excessively enlarged, the mechanical strength of the cells not only decreases but also the perpendicular magnetization film shifts to in-plane magnetization film, which enlargement is therefore undesirable. Therefore, in order to obtain a magnetic recording medium having high mechanical strength, it is necessary to minimize the enlargement of pore diameters and control the perpendicular coercive force.

According to this invention, even if the pore diameter is less than 400 Å, the perpendicular coercive force can be controlled to achieve its value of not more than 1,000 Oe by incorporating P atoms into Fe in the fine pores of an alumite. Further, even when the pore diameter is 400 Å or more, this invention is usable to decrease the perpendicular coercive force without changing the pore diameter.

As mentioned above, by depositing and filling a Fe-based ferromagnetic material containing from not less than 0.2 at% to not more than 25.0 at% of P atoms in the fine pores of an anodized Al film having a pore diameter of less than 400 Å, it is possible to adjust the saturation magnetization into the range of from 200 to 600 emu/cc and the perpendicular coercive force into the range of from 500 to 1,000 Oe while maintaining the perpendicular magnetization film characteristics.

Figure 1A:
FIG. 1(a) is a photograph showing a bright field image of Fe particles containing 12 wt.% P by a transmission electron microscope
Figure 1B:
FIG. 1(b) is a bright field image of Fe particles containing no P by a transmission electron microscope.

The following discussion will explain why the coercive force of the Fe-plated alumite film is decreased by incorporating phosphorus atoms (P) into Fe. FIG. 1(a) and FIG. 1(b) show transmission electron microscope images of the Fe particles which were taken from alumites. As shown in FIG. 1(a), when 12 at% of P is contained, it is observed that a microstructure is present in the Fe particles. Meanwhile, as shown in FIG. 1(b), when no P is contained, no microstructure is observed.

Figure 2A:
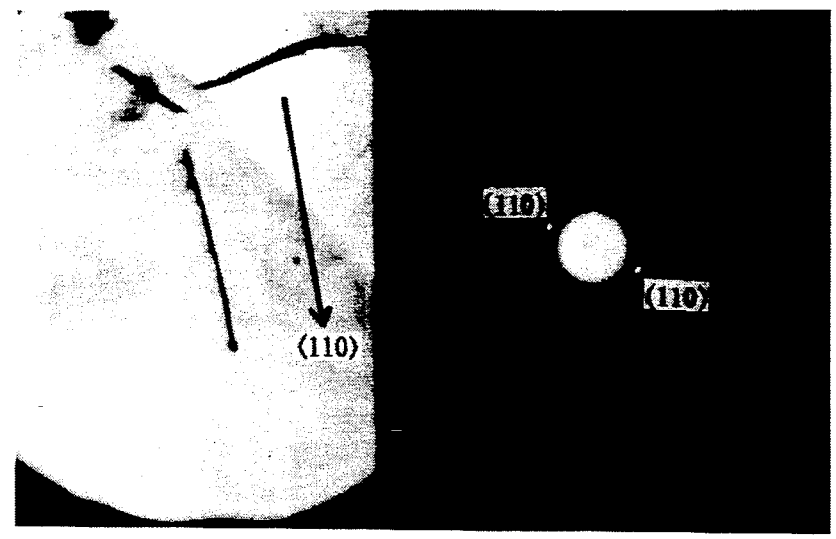
FIG. 2(a)(i) is a photograph showing a bright field image of Fe particles containing 12 wt.% P by a transmission electron microscope, FIG. 2(a)(ii) is a photograph showing its electron beam diffraction pattern, FIG. 2(b)(i) is a photograph showing a bright field image of Fe particles containing no P by a transmission electron microscope, and FIG. 2(b)(ii) is a photograph showing its electron beam diffraction pattern.
Figure 2B:
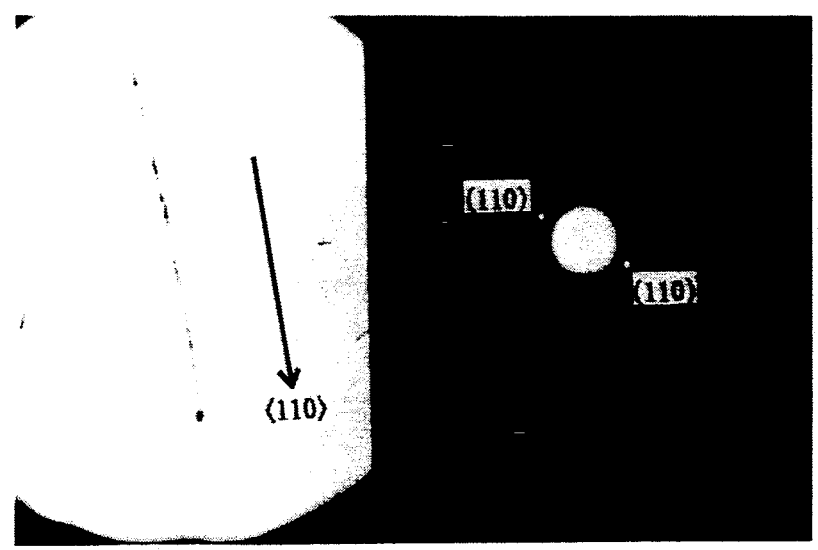

FIG. 2(a)(i) shows a dark field image of Fe particles containing P, and FIG. 2(b)(i) shows a dark field image of Fe particles containing no P. And FIG. 2(a)(ii) and FIG. 2(b)(ii) show electron beam diffraction patterns thereof. Regardless of the presence or absence of P, the diffraction from the (110) plane is most intense, and the (110) direction of Fe determined on the basis of the diffraction spot of the (110) surface is in agreement with the longitudinal direction of Fe particles. However, as shown in FIG. 2(a)(ii), when P is contained, the spot of (110) is radially expanded as compared with the case of containing no P shown in FIG. 2(b)(ii), and the case of containing P shows the inferior (110) orientation property of the Fe particles.

Figure 3A:
FIG. 3(a) is a photograph showing a dark field image of Fe particles containing 12 wt.% P.
Figure 3B:
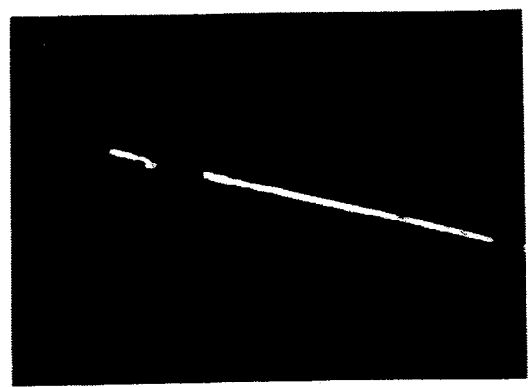
FIG. 3(b) is a photograph showing a dark field image of Fe particles containing no P.

FIG. 3(a) and FIG. 3(b) show dark field images formed through the (110) spots of Fe particles. In FIG. 3(a), since 12 at% of P is included in the Fe particles, the Fe particles form a partially bright image having a length, in the longitudinal direction, of about 0.5 μm, and it is considered that the length of single crystals is ~0.5 μm. On the other hand, in FIG. 3(b) showing a case of containing no P, the Fe particles form a bright image having a length, in the longitudinal direction, of over 2 μm, in which range Fe is present as a single crystal.

Figure 4:
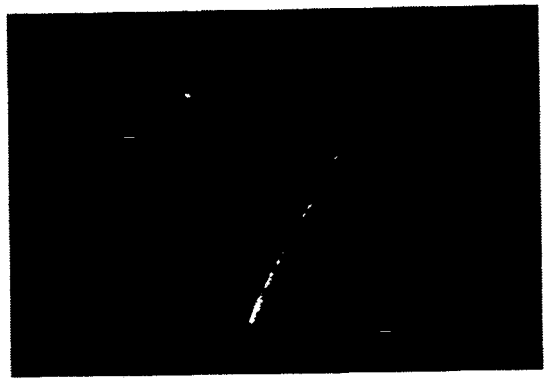
FIG. 4 is a photograph showing a dark field image of Fe particles containing 25 wt.% P.

FIG. 4 shows a dark field image of Fe particles formed through the (110) spot when Fe contains 25 at% of P. It is observed that the Fe particles are constructed of much more smaller Fe microcrystals than those of the Fe particles containing 12 at% of P.

The above results show that if P is contained in Fe particles, the Fe particles crystallographically lose their continuity, undergo degradation of the (110) orientation, and have microstructures inside. Besides P, a like effect can be also obtained by incorporating S, Cu or B. As a result, the anisotropy of the articular Fe particles is degraded, the magnetization reversal mechanism approaches a buckling mode or fanning mode, and the magnetization is reversed by a weak external magnetic field. That is, it is considered that the coercive force is degraded.

As a source of P-atoms incorporated to the Fe, usable are phosphorus compounds which are soluble in the Fe-plating bath. The phosphorus compounds have a valence of +3 or less, and suitably usable are phosphites and hypophosphites, e.g., sodium phosphite ($Na_2HPO_3$), sodium hypophosphite ($NaPH_2O_2$), etc. The phosphites and hypophosphites may be used alone or in combination. P which has a valence of more than 3 is not included in Fe. Phosphoric acid ($H_3PO_4$) is therefore not to be a source of phosphorus even if it is added into the Fe-plating bath. In this case, the valence of P is +5, and the electron configuration of P is the same as that of Ne. It is therefore considered that the above phenomena occurs because P having a valence of +5 is stabilized and that such P neither donates nor receives any electron when the plating is carried out.

The P content in Fe is preferably not more than 25.0 at%, and if the P content exceeds 25.0 at%, undesirably, the perpendicular coercive force decreases to less than 500 Oe and the magnetic characteristics are degraded. In addition, with regard to the lower limit of the content of P-atoms in Fe, the amount of P atoms added into Fe may be small as long as the added P-atoms have an effect on the decrease of the coercive force, and any P content, if it makes it possible to adjust the perpendicular coercive force to the range of from 500 ~1,000 Oe with Ms 200 ~600 emu/cc, is sufficient. As a general parameter, the P content is preferably not less than 0.2 at%.

The content of P-atoms in Fe can be controlled not only by changing the concentration of a phosphorus compound in the plating bath but also by changing the plating conditions such as a plating time, charging voltage, pH, bath temperature, etc.

The phosphites and hypophosphites used for the production of the magnetic recording medium of this invention are gradually oxidized by oxidizing species in air or the plating bath to form phosphates, and the phosphates react with Fe in the plating bath to form a precipitate of iron phosphate [$Fe_3(PO_4)_2$, and others]. At the same time, the P content decreases in the Fe-P plating bath, and the composition of the plating bath changes significantly. As a result, the problems are that the content of a P component in the resultant Fe-P plated film decreases greatly, that the coercive force of a formed perpendicular magnetization film increases and that it is very difficult to adjust the coercive force into the predetermined level.

In order to avoid the above problems, for example, it is desirable to remove oxidizing species (e.g., oxygen) dissolved in the plating bath by substituting an inert gas for them. The substitution is carried out, for example, by allowing an inert gas to bubble in water (e.g., purified water, deionized water, pure water) to be used in the plating bath, or by allowing an inert gas to bubble in a prepared Fe-P plating bath. The electroplating is carried out by placing the above deoxidized Fe-P plating bath under an inert atmosphere.

The above procedural constitution makes it possible to prevent oxidation of phosphite or hypophosphite contained in the Fe-P plating bath as much as possible and maintain the composition of the plating bath constantly in a predetermined range. It is therefore possible to obtain magnetic recording media having a perpendicular magnetization film of which the coercive force is so controlled as to be at the desired low level.

Examples of the inert gases usable in this invention include $N_2$, Ar, He, etc. These gases may be used alone or in combination. In view of ease of availability and cost, $N_2$ gas is preferable.

Al or Al alloy can be formed into a film on a nonmagnetic substrate by the usual physical deposition method. The physical deposition method is well known to one of ordinary skill in the art, and its explanation is therefore unnecessary. An undercoat layer of, e.g., Ti, etc., may be formed between the nonmagnetic substrate and the Al metal layer. The thickness of the undercoat layer is not specially limited. In general, however, its thickness is preferably in the range from 0.01 $\mu$m to 10 $\mu$m.

The method of anodic oxidation of Al or Al alloy is well known to one of ordinary skill in the art, and its explanation is therefore not given herein.

Examples of the nonmagnetic substrate usable in the magnetic recording medium of this invention include, besides an aluminum sheet, polymer films such as polyimide, polyethylene terephthalate, etc., glasses, ceramics, metal sheets of anodized aluminum, brass, etc., Si single crystal sheet, Si single crystal sheet of which the surface is thermally oxidized, and the like.

Further, the magnetic recording medium of this invention has a variety of forms in which the medium is in slide-contact to a magnetic head, and its examples include magnetic tapes and disks having, as a substrate, a synthetic resin film such as a polyester film, polyimide film, etc., magnetic disks and drums having, a substrate, a disk or drum of a synthetic resin film, aluminum sheet, glass sheet, and others.

DESCRIPTION OF THE PREFERRED EMBODIMENTS

EXAMPLE 1

A rolled Al sheet having a purity of 99.99% (thickness 65 $\mu$m, 20 mm×20 mm) was alkali-etched with a 5 wt.% NaOH aqueous solution, washed with water and then neutralized with a 6 vol.% $HNO_3$ aqueous solution. Thereafter, the Al sheet was anodized (opposite electrode: carbon) in an aqueous solution containing 1 mole/l of $H_2SO_4$ at a current density of 1A/dm$^2$, to form an anodized film having a thickness of 0.45 $\mu$m. The cell diameter and pore diameter in the above film were 460 Å and 150 Å, respectively.

Then, the Al sheet was immersed in a 1 wt.% $H_3PO_4$ aqueous solution at 30° C. for 9 minutes to enlarge the fine pores of the anodized film to 250 Å. Thereafter, the Fe-P electroplating was carried out in a plating bath containing A mole/l of $FeSO_4 \cdot (NH_4)_2SO_4 \cdot 6H_2O$, B mole/l of $NaPH_2O_2H_2O$, 0.2 mole/l of $H_3BO_3$ and 2 ml/l of glycerine. In this case, the amount of hypophosphite in the plating bath was adjusted by changing B/A within the range of from 0 to 5 while maintaining the relationship of $5A+2B=1.0$. A 2N $H_2SO_4$ aqueous solution was added to the plating bath to adjust its pH to 3.3, and the plating bath temperature was adjusted to 22° C. The power sources used for the plating were sinusoidal AC 500 Hz, 16$V_{p-p}$ [-8V on the alumite side and +8V on the opposite electrode (carbon) side], 14$V_{p-p}$ [-8V on the alumite side and +6V on the opposite electrode side] and 15$V_{p-p}$ [-10V on the alumite side and +5V on the opposite electrode side]. The plating time was set to be a period of from 30 seconds to 5 minutes to prepare Fe plated alumite films having various P contents.

EXAMPLE 2

The procedure of Example 1 was repeated to prepare an alumite-plated Fe film except that the Al sheet was immersed in a 1 wt.% $H_3PO_4$ aqueous solution at 30° C. for 7 minutes to enlarge its pore diameter to 220 Å.

EXAMPLE 3

The procedure of Example 1 was repeated to prepare an alumite-plated Fe film except that the Al sheet was immersed in a 1 wt.% $H_3PO_4$ aqueous solution at 30° C. for 11 minutes to enlarge its pore diameter to 270 Å.

EXAMPLE 4

A rolled Al sheet having a purity of 99.99% (thickness 65 $\mu$m, 20 mm×20 mm) was alkali-etched with a 5 wt.% NaOH aqueous solution, washed with water and then neutralized with a 6 vol.% $HNO_3$ aqueous solution. Thereafter, the Al sheet was anodized (opposite electrode: carbon) in an aqueous solution containing 1 mole/ of $H_2SO_4$ at a current density of 1A/dm$^2$, to form an anodized film having a thickness of 0.45 $\mu$m. The cell diameter and pore diameter in the film were 460 Å and 150 Å.

Then, the Al sheet was immersed in a 1 wt.% $H_3PO_4$ aqueous solution at 30° C. for 9 minutes to enlarge the fine pores of the anodized film to 250 Å. 0 g/l, 0.28 g/l, 0.55 g/l and 1.38 g/l of $Na_2HPO_3 \cdot 5H_2O$ were respectively added to basic Fe plating baths containing 50 g/l of $FeSO_4 \cdot (NH_4)_2SO_4 \cdot 6H_2O$, 15 g/l of $H_3BO_3$ and 2 m( of glycerine, and electroplating was carried out to prepare Fe plated alumite films having different P contents.

The power source used for the plating was of AC 500 Hz, $15V_{p-p}$, and DC bias was applied to charge $-10V$ on the alumite side and $+5V$ on the opposite electrode (carbon) side. The plating times were set for 10 to 25 seconds.

Figure 5:
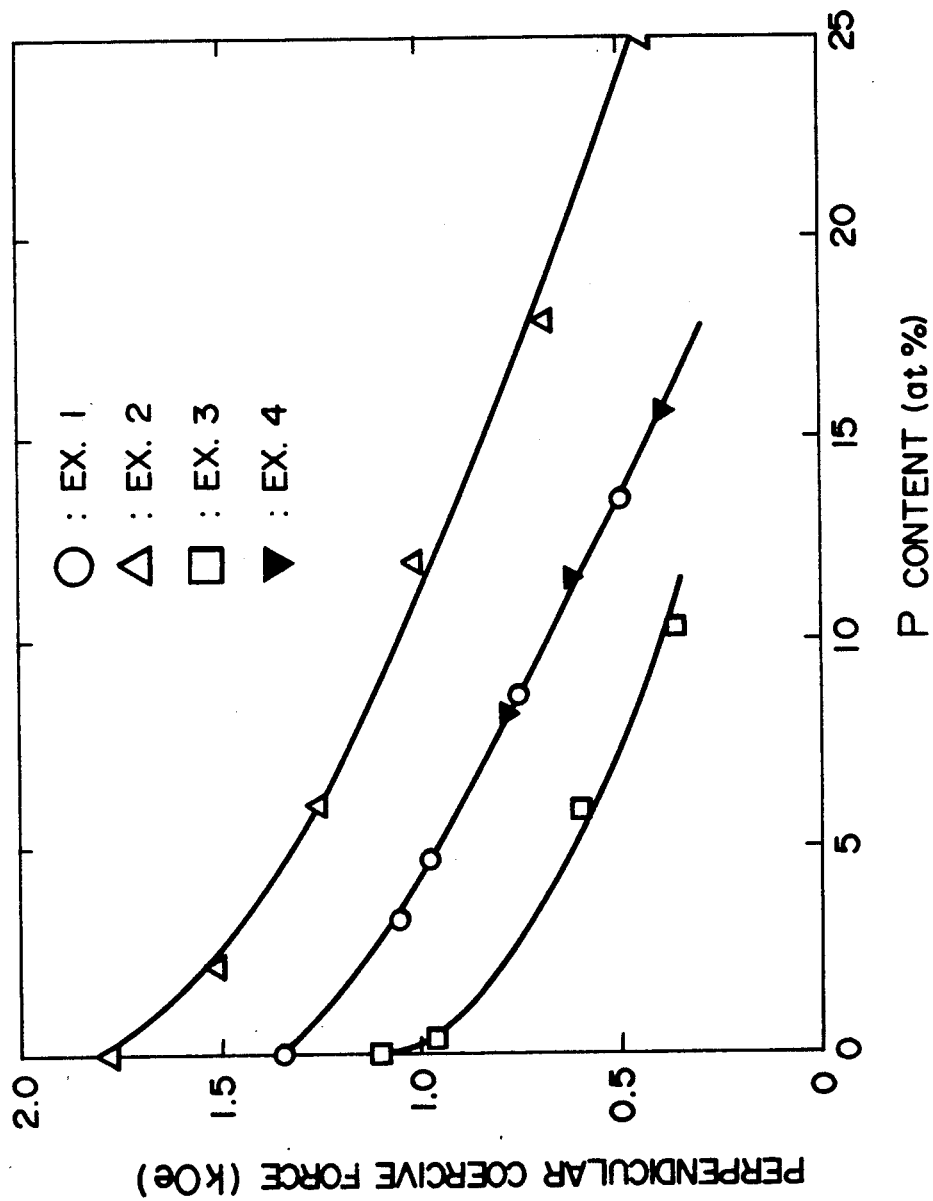
FIG. 5 is a characteristics illustration showing a relationship between a P content and a perpendicular coercive force.

FIG. 5 shows a relationship between the P content (existence ratio to Fe: at%) of each of the Fe plated alumite films obtained in Examples 1 to 4 and their coercive forces perpendicular to the surface of the films. With regard to these films, the quantitative P and Fe determinations were carried out by using an EPMA (Electron probe micro analysis), and the coercive forces were measured with a VSM (vibrational sample magnetometer). As is clear in FIG. 5, as the P content increases, the coercive force decreases. As FIG. 5 shows, by changing the P content to 0.2 ~25 at%, it is made possible, even in the pore diameter of less than 400 Å, to control the coercive force freely to achieve its range of from 500 to 1,000 Oe.

Figure 6:
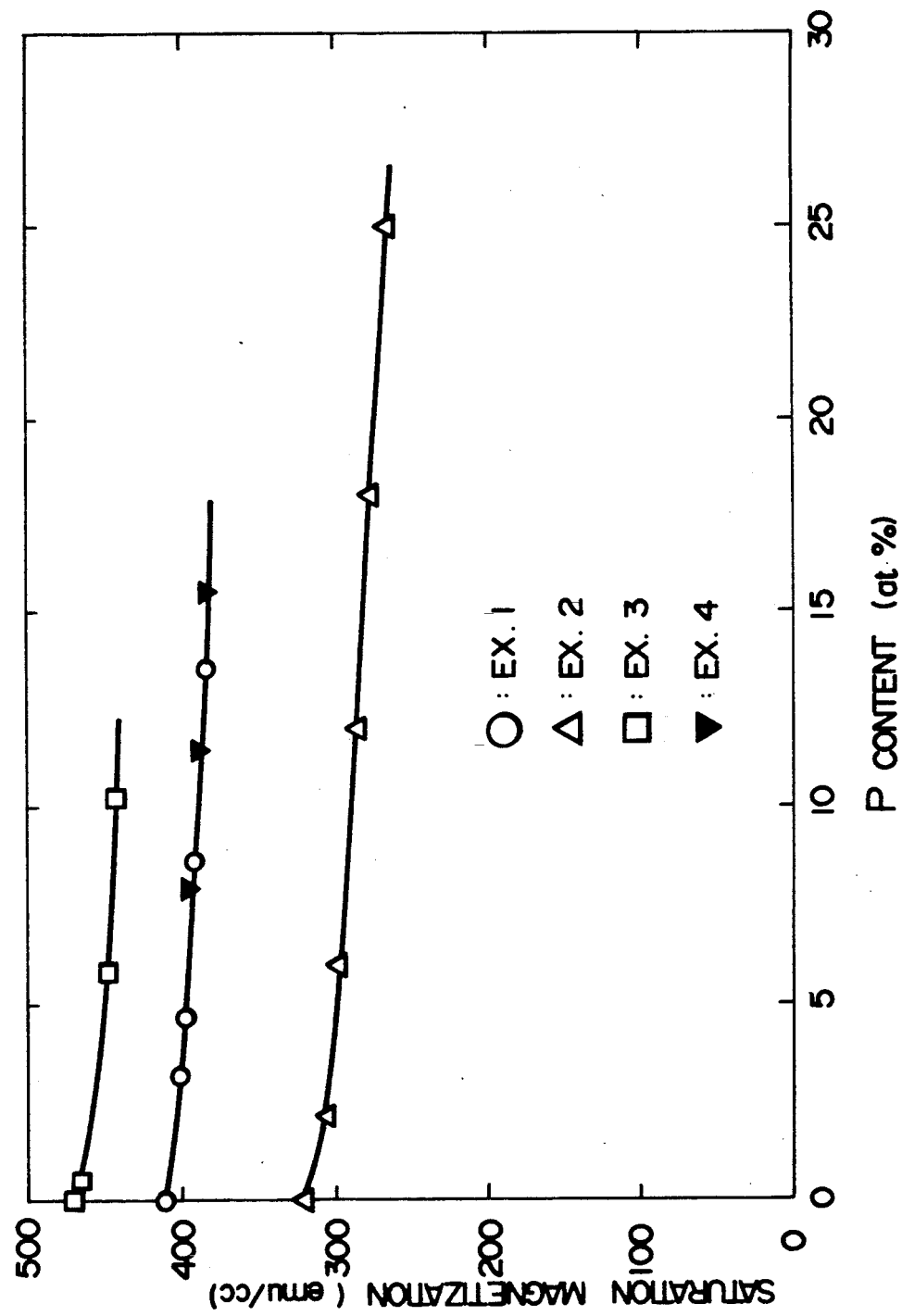
FIG. 6 is a characteristics illustration showing a relationship between a P content and a saturation magnetization.

FIG. 6 shows relationships between P contents and saturation magnetizations of the Fe plated alumite films. When P is not contained, the saturation magnetizations of the a Fe plated alumite films are 410 emu/cc (430 emu/cc, calculated on the basis of the film porosity of 0.25) in Examples 1 and 4, 320 emu/cc (340 emu/cc, calculated on the basis of the film porosity of 0.20) in Example 2, and 470 emu/cc (490 emu/cc, calculated on the basis of the film porosity of 0.285) in Example 3. In each of Examples, the saturation magnetization is smaller by about 5% than the value obtained by calculation on the basis of the film porosity. The cause therefor is considered to be iron oxides or a disorder of pores. As the P content increases, the saturation magnetization decreases. However, the saturation magnetization cannot be less than 200 emu/cc, and it is considered that the decrease in the saturation magnetization does not have much influence on an output decrease.

EXAMPLE 5

A rolled Al sheet having a purity of 99.99% (thickness 65 μm, 20 mm×20 mm) was treated in the same way as in Example 1, and then anodized in a 3 wt.% oxalic acid bath (opposite electrode: carbon) by using a constant voltage of 40 V to form an alumite having a thickness of 8 μm. The cell diameter and pore diameter in the film were 960 Å and 320 Å. Then, this sample was immersed in a 1 wt.% phosphoric acid aqueous solution at 30° C. for 19 minutes to enlarge the pore diameter to 500 Å. Thereafter, 0 g/l, 0.14 g/l, 0.68 g/l and 1.35 g/l of $NaPH_2O_2.H_2O$ were respectively added to basic Fe plating baths containing 50 g/l of $FeSO_4 \cdot (NH_4)_2SO_4 \cdot 6H_2O$, 15 g/l of $H_3BO_3$ and 2 ml/l of glycerine, and the electroplating with Fe-P was carried out. The baths were adjusted to a pH of 3.0 with 2N $H_2SO_4$, and the bath temperatures were adjusted to 22° C. The power source used for the plating was of AC 500 Hz, $15V_{p-p}$, and DC bias was applied to charge $-10V$ on the alumite side and $+5V$ on the opposite electrode (carbon) side. The plating times were set for 7 to 10 minutes.

FIG. 7 shows a relationship between an $NaPH_2O_2/Fe^{2+}$ molar ratio in the plating bath and the coercive force of the film. When $NaPH_2O_2$ is not added, the film shows a coercive force of 800 Oe. However, when the molar ratio of $NaPH_2O_2$ in the plating bath increases, the coercive force decreases. As mentioned above, by incorporating P into Fe, even if the pore diameter is 400 Å or more, it is made possible to control the coercive force without enlarging the pore diameter (in this Example, the pore diameters were constantly 500 Å).

EXAMPLE 6

A rolled Al sheet having a purity of 99.99% (thickness 65 μm, 20 mm×20 mm) was anodized in a 2N sulfuric acid bath (opposite electrode: carbon) at a current density of $1A/dm^2$ to form an anodized aluminum film (alumite) having a thickness of 0.45 μm. The cell diameter and pore diameter in the film were 460 Å and 150 Å. Then, the above sample was immersed in a 1 wt.% phosphoric acid ($H_3PO_4$) aqueous solution at 30° C. for 9 minutes to enlarge the pore diameter of the anodized film to 0.025 μm.

When preparing an Fe-P plating bath, an $N_2$ gas was allowed to bubble in a pure water (distilled water) for about 1 hour to substitute the $N_2$ gas for oxygen dissolved in the water. 50 g/l of Mohr's salt, 15 g/l of boric acid, 2 ml/l of glycerine and 1.4 g/l of sodium hypophosphite were dissolved in the $N_2$ gas-substituted pure water, and 2N sulfuric acid was added to adjust the plating bath to a pH of 3.0.

Figure 9:
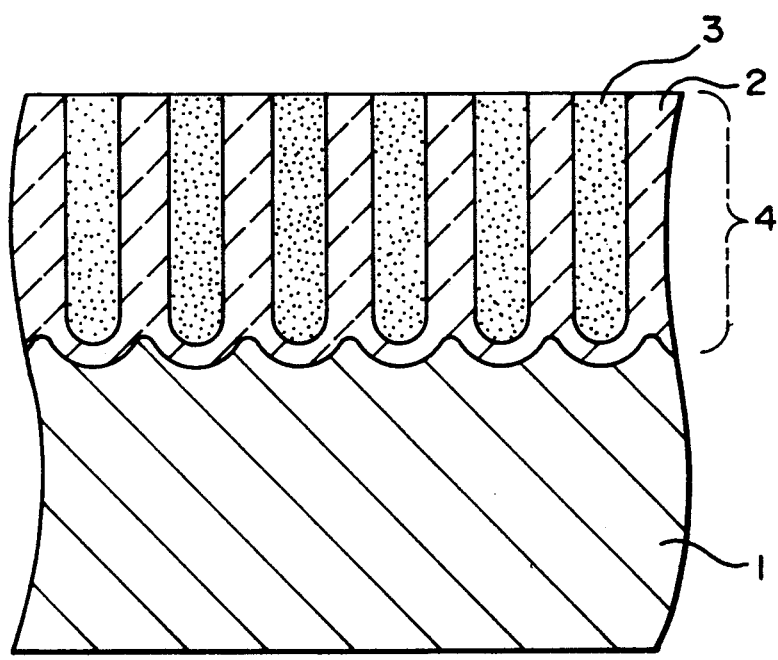
FIG. 9 is an illustration showing a cross sectional view of the magnetic recording medium having a perpendicular magnetization film, prepared in Example 6.

This Fe-P plating bath was placed inside a plating cell, which was then overall wrapped with a vinyl draft. While an $N_2$ gas was continuously introduced into the draft at a flow rate of 150 ml/minute, the Fe-P plating was carried out on the surface of the above sample, which was subjected to the enlargement of pore diameter of the anodized film as mentioned above, to prepare a perpendicular magnetization film having a cross sectional view shown in FIG. 9, in which numeral 1 indicates an aluminum substrate, 2 indicates the anodized film, 3 indicates an Fe-P plated film and 4 indicates a Fe-P plated alumite film. The power source used for the plating was of AC 500 Hz, $15V_{p-p}$, and DC bias was applied to charge $-10$ V on the anodized film side and $+5$ V on the opposite electrode (carbon) side. The plating time was set for 20 seconds. Under these conditions, the Fe-P plating was carried out with regard to more than 50 pieces of anodized film-possessing samples prepared in the same way as above, and phosphorus the contents in their Fe-P plated films of the samples were examined to show 7.5 ~8.0 at%.

Figure 8:
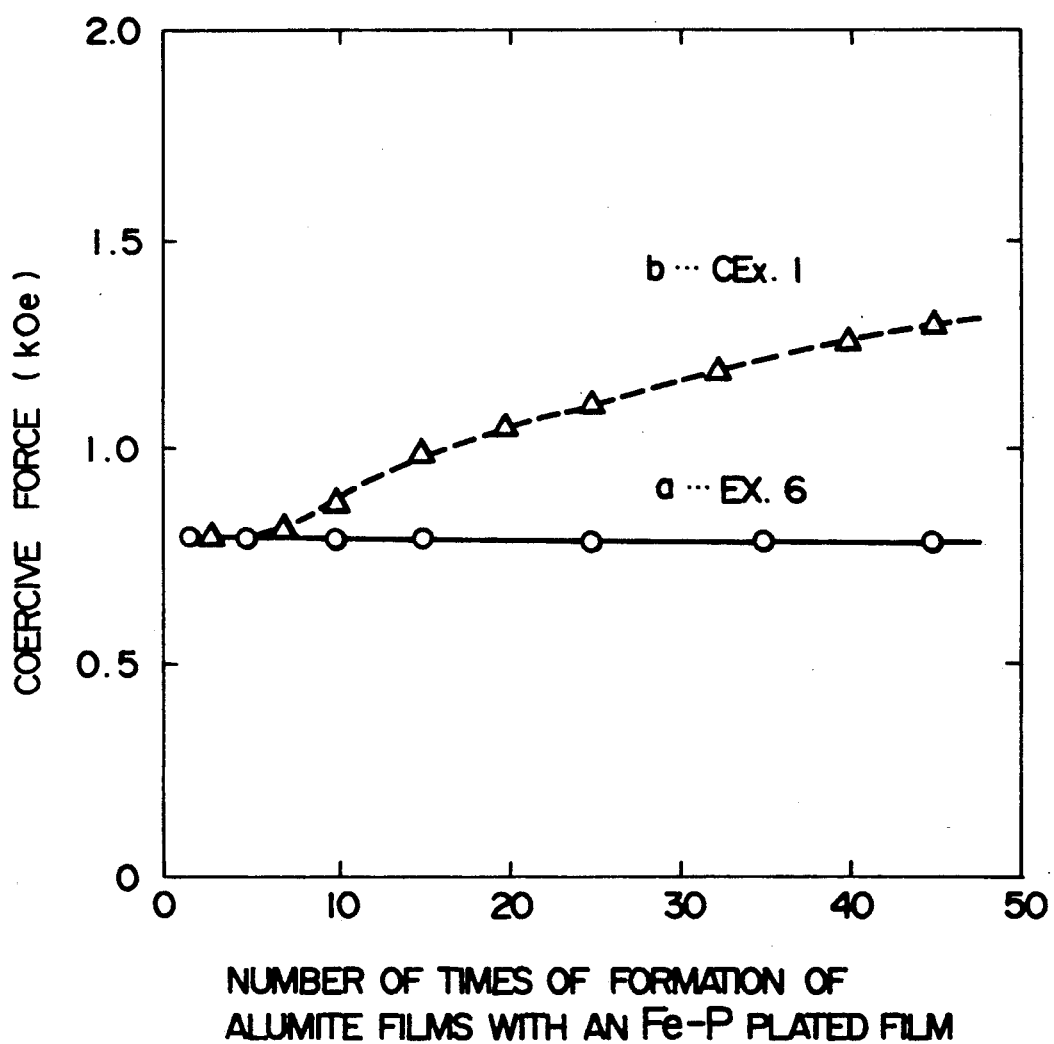
FIG. 8 is a characteristics illustration showing a relationship between the number of times of formation of alumite/plated Fe-P films and the perpendicular coercive forces of prepared perpendicular magnetization films.

In FIG. 8, a solid line a shows a relationship between the perpendicular coercive forces (k Oe) a Fe-P plated alumite films and the number (times) of formation of the alumite-plated Fe-P films. As clearly shown in FIG. 8, the process of this invention makes it possible to control the coercive force of perpendicular magnetization films to achieve a generally constant value of about 800 Oe even if 50 or more of Fe-P plated alumite films are formed.

EXAMPLE 7

Fe-P plated alumite films were formed in the same way as in Example 6 except that the inert $N_2$ gas was changed to an Ar, He or Kr gas. The coercive forces of the resultant perpendicular magnetization films were examined to show results nearly identical with those shown by the solid line in FIG. 8.

COMPARATIVE EXAMPLE 1

Fe-P plated alumite films were formed in the same way as in Example 6 to prepare perpendicular magnetization films except that the bubbling of an $N_2$ gas in pure water and wrapping of the plating bath with a draft under an $N_2$ gas atmosphere were not carried out.

In FIG. 8, a dotted line b shows a relationship between the coercive forces of the perpendicular magnetization films and the number of formation of Fe-p plated alumite films. As shown by the line b, in this Comparative Example 1 wherein the treatment for the removal of oxygen dissolved in the Fe-P plating bath and the wrapping of the plating bath were not carried out, the formed Fe-P plated alumite films started to show an increase in the perpendicular coercive force when the formation of the films was repeated seven times, and the coercive force increased to 1,300 Oe or more when the formation was carried out about 50 times, which shows that the Fe-P plating bath used in this Comparative Example lost the ability to maintain the coercive force at a predetermined low level.

As explained hereinabove, by incorporating P atoms into a ferromagnetic metal, such as Fe, etc., to be filled in the fine pores of an alumite while adjusting its content, but without counting on physical factors such as a pore diameter, cell diameter, film thickness, axial ratio, etc., this invention makes it possible to control the perpendicular coercive force freely in the range of from 500 to 1,000 Oe with the saturation magnetization in the range of from 200 to 600 emu/cc.

Further, by removing oxidizing species from the plating bath and plating atmosphere, the oxidation of phosphite or hypophosphite in the Fe-P plating bath is effectively prevented, and it is therefore made possible to maintain the amount of P contained in Fe nearly constantly at the predetermined level.

As a result, the coercive force of the perpendicular magnetization films can be controlled to achieve its determined value, and it is made therefore possible to obtain perpendicular magnetic recording media having excellent magnetic characteristics permitting high-density recording by using a magnetic head.

Needless to say that the adjustment of conventional physical factors can be carried out in addition to the adjustment of the P content according to this invention.

What is claimed is:

1. A magnetic recording medium having a perpendicular magnetization film filled with a magnetic metal containing Fe as a main component in the fine pores of an alumite formed by anodic oxidation of a surface of an Al or Al alloy substrate, the Fe being in the form of crystallographically discontinuous particles, the discontinuous particles of Fe containing atoms of an element selected from the group of elements consisting of P, S, Cu and B, wherein the resulting magnetic recording medium has a perpendicular coercive force in the range of 500 to 1,000 Oe with a saturation magnetization in the range of from 200 to 600 cmu/cc.

2. The magnetic recording medium according to claim 1 wherein the magnetic metal containing Fe as a main component is filled, by plating, in the fine pores of an alumite formed by anodic oxidation of a surface of Al or Al alloy substrate, the discontinuous particles of Fe containing atoms of P, said atoms of P having a valence of +3 or less.

3. The magnetic recording medium according to claim 2 wherein the content of the atoms of P in the Fe is from not less than 0.2 at% to not more then 25.0 at%.

4. The magnetic recording medium according to claim 1 wherein the fine pores have a pore diameter of less than 400 Å.

5. The magnetic recording medium according to claim 2 wherein the atoms of P are derived from phosphite and/or hypophosphite.

6. The magnetic recording medium according to claim 5 wherein the phosphite is sodium phosphite ($Na_2HPO_3$) and the hypophosphite is sodium hypophosphite ($NaPH_2O_2$).

* * * * *